United States Patent [19]

Moore

[11] Patent Number: 4,908,981

[45] Date of Patent: Mar. 20, 1990

[54] DEVICES AND METHODS FOR SELECTIVE APPLICATION OF HERBICIDE

[76] Inventor: James E. Moore, 555 Riviera Dr., Naples, Fla. 33940

[21] Appl. No.: 820,987

[22] Filed: Jan. 21, 1986

[51] Int. Cl.$^4$ ............................................. A01M 21/00
[52] U.S. Cl. ........................................ 47/1.5; 47/1.01; 172/199
[58] Field of Search ............................ 47/1.7, 1.5, 1 R; 172/684.5, 199; 280/475

[56] References Cited

U.S. PATENT DOCUMENTS

| | | | |
|---|---|---|---|
| 876,612 | 1/1908 | Watkins | 47/1.5 |
| 1,454,824 | 5/1923 | Stubfors | |
| 2,659,918 | 11/1953 | Stoner | 15/131 |
| 2,988,849 | 6/1961 | Laughlin | 47/1.5 |
| 2,994,142 | 8/1961 | Newell et al. | 172/684.5 |
| 3,002,319 | 10/1961 | Laughlin | 47/57.5 |
| 3,009,290 | 11/1961 | Bratton | 47/1.5 |
| 3,077,701 | 2/1963 | Osmun | 47/1.5 |
| 3,184,888 | 5/1965 | Furth et al. | 47/1.5 |
| 4,063,750 | 12/1977 | Mutchler | 280/475 |
| 4,126,962 | 11/1978 | Polcaro | 47/1.5 |
| 4,187,638 | 2/1980 | Hardy et al. | 47/1.5 |
| 4,291,491 | 9/1981 | Maddock | 47/1.50 |
| 4,305,224 | 12/1981 | Maddock | 47/1.50 |
| 4,309,842 | 1/1982 | Jones | 47/1.5 |
| 4,403,881 | 7/1984 | Keeton | 401/202 |
| 4,597,219 | 7/1986 | Kropf | 47/1.50 |

FOREIGN PATENT DOCUMENTS

| | | | |
|---|---|---|---|
| 929758 | 7/1955 | Fed. Rep. of Germany . | |
| 428721 | 10/1974 | U.S.S.R. . | |
| 2157935 | 11/1985 | United Kingdom | 47/1.7 |

OTHER PUBLICATIONS

S. M. Batten, "Those Irrepressible, Incredible, Impossible Grassy Weeds!", *USGA Green Section RECORD*, Sep.-Oct. 1984, pp. 1-4.

"The NEW Century SUPER-7 Wick Bar Applicator," Century Engineering Div., Ex-Cell-O Corp., 221 4th Ave., S.E., Cedar Rapids, Iowa, (6/81), (2 pgs.).

"Wipe Out Weeds with the NEW, Improved Walk A Wick", (1 pg.).

Primary Examiner—Robert A. Hafer
Assistant Examiner—Sam Rimell
Attorney, Agent, or Firm—Arnold, White & Durkee

[57] ABSTRACT

For the control of weeds in turfgrass, herbicide is selectively applied to the weeds overgrowing the height of the turfgrass after mowing. An applicator pad carrying the herbicide is drawn across the turfgrass as the pad is held parallel to the underlying ground and at a preset height just above the height of the turfgrass. For this purpose the applicator pad is supported by a skid having flat portions resting on the ground as the skid slides over the turfgrass. The preferred form of the skid for unestablished terrain is a large flat plate having an upturned leading edge portion and supporting the applicator pad behind its trailing edge. For established terrain, however, the skid preferably comprises a pair of runners near the respective transverse ends of the applicator pad, a horizontal transverse member preceding the applicator pad for uplifting horizontally extending weeds and raising the applicator pad in the event of the runners bridging a spot of high ground, and a pair of horizontal forward support bars intersecting at a draw bar and extending rearward to respective ends of the transverse member. The forward support bars form a plow for diverting foreign objects and for uplifting horizontally-extending weeds. Applicator assemblies are also disclosed for trim work.

20 Claims, 6 Drawing Sheets

DEVICES AND METHODS FOR SELECTIVE APPLICATION OF HERBICIDE

BACKGROUND OF THE INVENTION

1. Field of the Invention

This invention relates to devices and methods for the direct application of chemical substances to selected plants at specific locations thereon.

2. Background Art

The conventional method of applying chemical substance to vegetation is by spraying, sprinkling or sowing solutions or mixtures of the chemicals on the whole plant area. Such "broadcast" methods reduce the desired concentrations on the specific plants to be treated, increase the cost of the chemicals, and subject vegetation far removed from the treatment area to the chemicals due to "drift," "vaporization," "translocation," or "leaching".

To avoid these difficulties associated with the broadcast methods, the individual application of chemicals has been made by hand to selected plants. Selective application has permitted the use of highly potent but relatively safe non-selective herbicides for the control of weeds and other undesirable vegetation. A preferred kind of non-selective herbicide is a 41% solution of isopropylamine salt of N-(phosphonomethyl) glicine, as further described in U.S. Pat. Nos. 3,799,758 and 4,405,531, and sold under the trademark "ROUNDUP" by the Monsanto Company, Agricultural Products Div., St. Louis, Missouri, 63167.

As disclosed in Laughlin U.S. Pat. No. 2,988,841, mechanical devices have been proposed for the direct application of chemical substances to selected plants at specific locations thereon An applicator such as a brush or pad is traversed across the area of vegetation at a pre-selected height, speed and angle, so as to produce a treatment zone without affecting underlying vegetation. Such a mechanical device includes height controlling wheels and a push handle or tractive support, or applicator brushes or pads are adjustably mounted on a rake-like structure.

Mechanical devices for the direct application of chemical substances to plants have been manufactured and sold as attachments to tractors Hardy et al. U.S. Pat. No. 4,187,638 discloses a rope wick applicator in the form of an elongated pipe having a number of exposed portions of wick protruding from the pipe at spaced locations. Similarly, an applicator has been manufactured and sold by Ex-Cell-O Corporation, Century Engineering Division, Cedar Rapids, Iowa 52401, in the form of an elongated pipe having its lower outer surface covered with a carpet fed with chemical solution.

Weed control at golf courses has been an especially difficult task. As described by Steve M. Batten in his article "Those Irrepressible, Incredible, Impossible Grassy Weeds!" USGA Green Section RECORD, September/October 1984 pp. 1-4, millions of dollars are spent annually and thousands of hours are devoted to golf course weed control. Weed control methods include scalping, deep-set vertical mowing, turning off irrigation, hand removal, excavation, and starvation by eliminating normal fertilization. Spot application of nonselective herbicide is typically made with hand-held sprayers, plastic squeeze bottles, hypodermic syringes, and paint brushes. Spot application requires the judgment of a person to determine what is a weed or where to place the herbicide. For this reason, this type of weed control is hard to automate or conduct with large tractors or maintenance vehicles. However, there are methods to selectively place herbicides such as "ROUNDUP" with large implements. Rope wick applicators can paint the top half of tall fescue or smutgrass above the grown height of desired turfgrasses. Weed kill results by translocation of the "ROUNDUP".

Rope wick or pad applicators have not been sufficiently accurate to selectively kill undesirable vegetation that extends only slightly above the desired vegetation, without causing some damage to the desired vegetation. This basic problem has been found to be related to a number of subsidiary problems including unstable operation of the applicator, undue complexity, inability to cover large areas in a reasonable time period, and the influence of uneven ground, clumps of weeds and foreign objects.

SUMMARY OF THE INVENTION

The primary object of the present invention is to provide an herbicide applicator assembly which maintains an herbicide applicator at a precise level just above desired vegetation and covers a large area in a short time period despite uneven ground, clumps of weeds, and foreign objects.

Another object of the invention is to provide a mechanical device in an herbicide applicator assembly for elevating lengthy portions of weeds extending laterally below the mowed surface of turf, so that the surfaces of such weeds are raised to contact the herbicide applicator.

Still another object of the invention is to provide an herbicide applicator having a self-contained supply of herbicide sufficient for several hours of operation at a speed of up to about ten miles per hour or more. A related object is to provide a precise means for regulating the supply of herbicide to the active surface of the herbicide applicator for several hours of continuous operation.

Yet another object of the invention is to insure uniform transverse distribution of herbicide to the herbicide applicator, particularly during operation over sloping terrain A related object is to prevent dripping of herbicide from the applicator.

And still another object of the invention is to insure that the operation of the herbicide applicator is unaffected by contamination by grass clippings or foreign objects.

BRIEF DESCRIPTION OF THE DRAWINGS

Other objects and advantages of the invention will become apparent upon reading the following detailed description and upon reference to the drawings, in which.

While the invention is susceptible to various modification and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Figures 1, 2, 3:
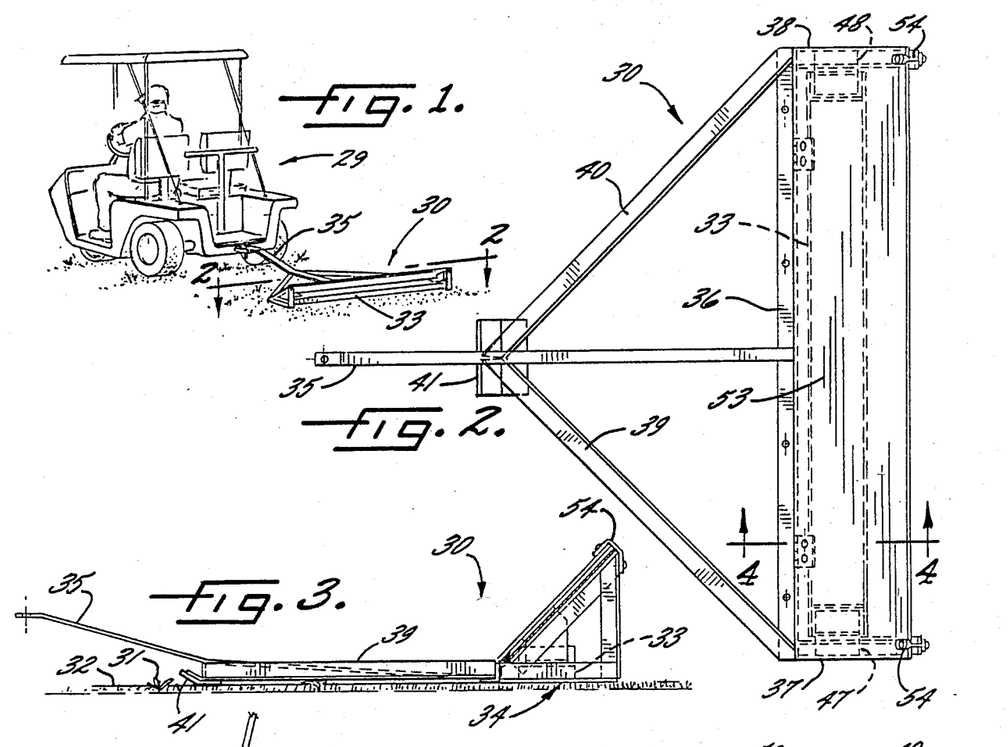
FIG. 1 is a perspective view showing a preferred embodiment of an herbicide applicator assembly according to the present invention being drawn by a golf cart.
FIG. 2 is a plan view of the applicator assembly shown in FIG. 1.
FIG. 3 is a side view of the applicator assembly shown in FIG. 2.

Turning now to the drawings, there are shown in FIGS. 1–3 various views of an herbicide applicator assembly generally designated 30 according to an important aspect of the present invention. In order to selectively apply herbicide to undesired vegetation or weeds 31 growing above desired vegetation such as turfgrass 32, the herbicide is carried by an applicator pad 33 supported at a precise height above ground by a frame generally designated 34. The applicator pad 33 is set at just above the height of the turfgrass 32 and the frame 34 is pulled in a longitudinal directional so that the applicator pad 33 wipes only the upper portion of the weeds 31.

The frame 30 is preferably made of conventional aluminum extrusions such as aluminum bars, angle stock, rails, and other standard shapes typically used for making aluminum structures. In working prototypes, the sections of aluminum extensions were fastened together by machine screws and pop rivets, although in production models the extrusions might be welded or riveted together.

For drawing the frame 34, the frame has a draw bar 35 for connection to a maintenance vehicle such as a golf cart 29 shown in FIG. 1. A number of applicator assemblies such as the assembly 30 could be drawn simultaneously by the same vehicle 29 in ganged fashion as is common for horizontal reel-type lawn mowers, but care should be exercised in hooking adjacent transverse end portions of the applicator assemblies together to avoid overlap, since overlap could cause the upper portions of weeds having herbicide applied thereto to become wiped against the turfgrass. The draw bar 35 is connected to a horizontal transverse support member 36 which is spaced parallel to the applicator pad 33 and has its end portions connected to the forward end portions of left and right runners 37, 38.

For applying herbicide to weeds in established turf, the runners 37, 38 are primarily responsible for maintaining the entire applicator pad 33 at a precise height above the ground. The transverse support member 36, however, will also raise the applicator pad 33 above high spots passing between the runners 37, 38 as the applicator assembly is drawn to cover a swath of vegetation.

In order to prevent debris such as trash and pine cones from being lodged under the transverse member 36, a pair of forward support members 39, 40 are connected to the draw bar 35 at a forward location and extend in a rearward direction to respective end portions of the transverse member 36. The forward support members 39, 40 preferably have an angled cross-section with horizontal and vertical planar portions, the vertical planar portion being arranged behind the horizontal portion, so that the forward support members function as a plow to lift and divert foreign matter away from the path of the applicator pad 33. To prevent gouging of the turfgrass 32, the connection between the draw bar 35 and the forward support members 39, 40 is supported on the ground by a skid 41.

Figures 4, 5, 6:
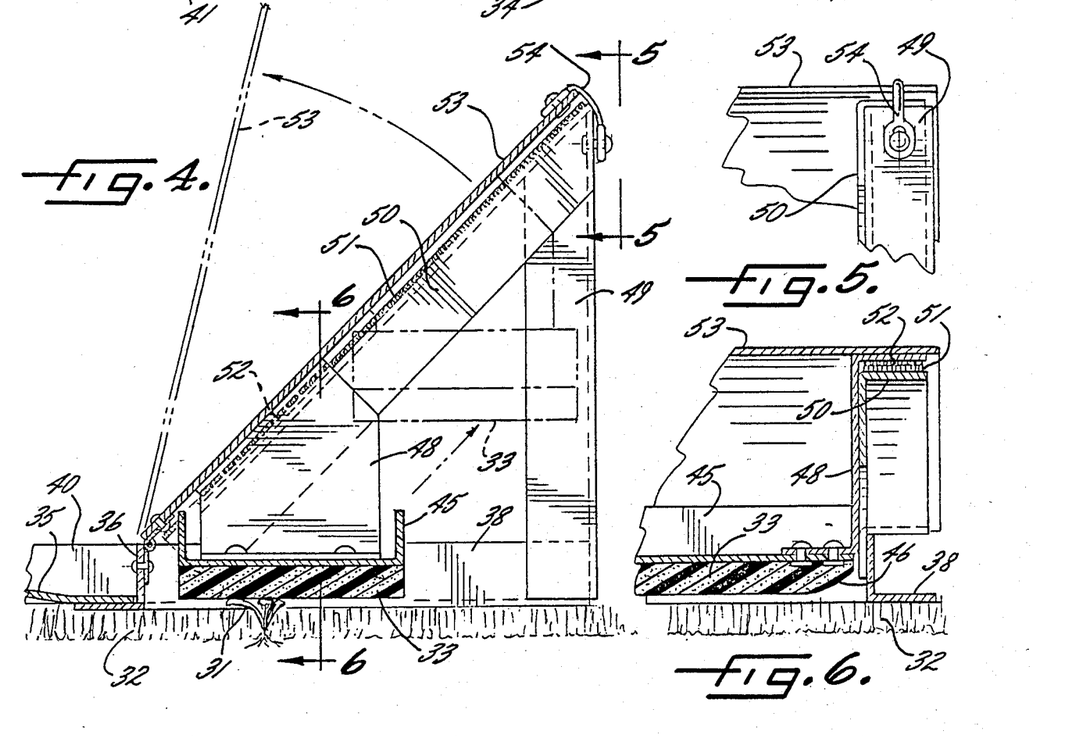
FIG. 4 is a cross-sectional view along line 4—4 in FIG. 2.
FIG. 5 is a detailed view showing the fastener used in FIG. 4 for clamping the applicator pad at a desired level.
FIG. 6 is a transverse section view of the applicator pad along section line 6—6 in FIG. 4.

Turning to FIG. 4, the applicator pad 33 is shown in further detail. The pad 33 is made of porous, open cell polyurethane foam capable of absorbing a fair amount of liquid herbicide. The pad 33 is glued to a transverse rail 45 and the pad and rail are continuous across the width of the applicator assembly 30.

In order to provide continuous adjustment of the height of the applicator pad 33, the end portions of the transverse rail 45 are fastened to respective mounting brackets 47, 48 positioned along respective inclined supports each including a vertical member 49 and an inclined member 50 resting on a respective one of the runners 37, 38.

To maintain the selected position of the mounting bracket 48 on the inclined member 50, the respective inclined surfaces of the bracket and inclined member are covered with respective strips of self engaging "VELCRO" (trademark) fabric 51, 52. Engagement of the VELCRO is further insured by a cover 53 hinged to the transverse member 36. The cover 53 also serves to cover and protect the applicator pad 33 from foreign objects. The cover 53 clamps the hanger 48 to the inclined member 50 and is secured in its closed position by an elastic strap 54 further shown in FIG. 5. As shown in phantom lines in FIG. 4, the cover 53 is hinged to an upward position to permit the applicator pad 33 to be raised.

The cover 53 is also opened to permit the entire applicator pad 33 to be removed for adding liquid herbicide. Preferably the liquid herbicide, such as the isopropylamine salt of glyphosate, is applied to the pad 33 by dipping the pad in a rectangular trough (not shown) containing the liquid herbicide solution, and the pad is squeezed in the trough to liberate excess herbicide from the pad and to insure that the pad is evenly soaked with the herbicide. After this squeezing operation, the amount of herbicide in the pad will be insufficient to cause dripping during operation of the applicator assembly.

As shown in greater detail in FIG. 6, the end portions of the applicator pad 33 are tapered and preferably sealed with adhesive 46 to prevent dripping of the liquid herbicide when the applicator pad is tilted in the transverse direction.

Figure 7A:
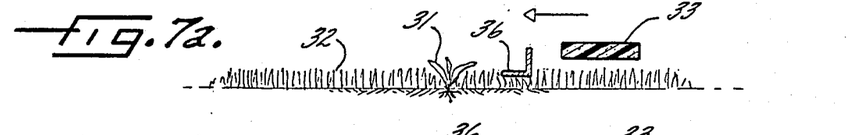
FIGS. 7a–7e show stop motion views of the herbicide applicator pad and a horizontal transverse member acting as a lifter bar to raise a horizontally extending portion of a weed into contact with the applicator pad.
Figure 7B:
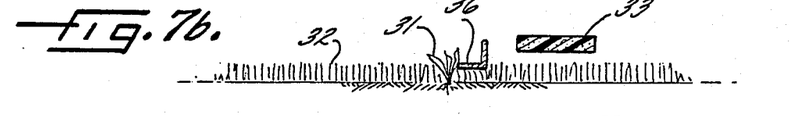
Figure 7C:
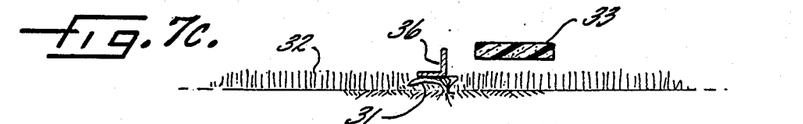
Figures 7D, 7E, 8, 9, 10, 11A, 11B:
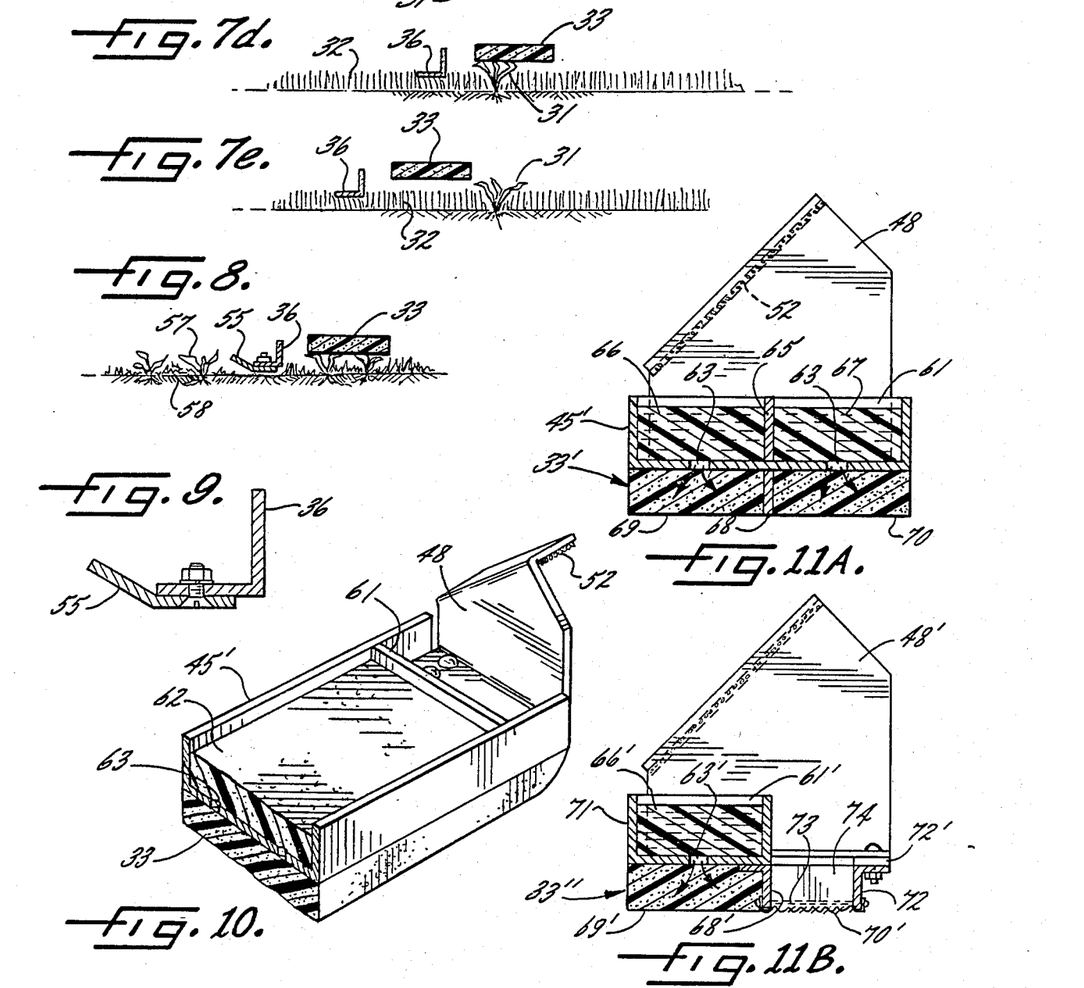
FIG. 8 shows the operation of a skid attached to the horizontal transverse member for raising the applicator pad above a portion of high ground.
FIG. 9 is a detailed view of the skid and horizontal transverse member shown in FIG. 8.
FIG. 10 is a detailed view showing an applicator pad being continuously fed with liquid herbicide from an upper sponge reservoir.
FIG. 11A is a cross-sectional view of a multistage applicator for applying two different liquid chemicals to selected vegetation.
FIG. 11B is a cross-sectional view of a multistage applicator for applying a liquid chemical and a soluble solid chemical to selected vegetation.
Figure 12:
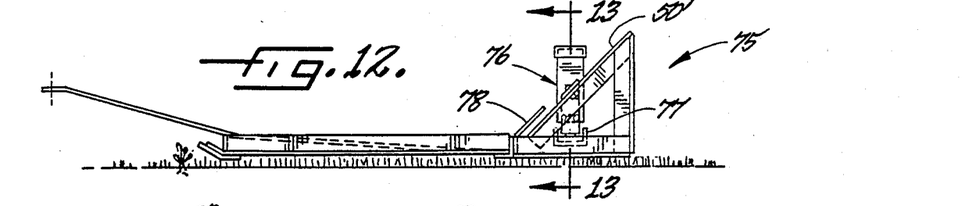
FIG. 12 shows an alternative construction of the applicator assembly of FIG. 3 using a large liquid herbicide reservoir and having means for regulating the flow of herbicide from the reservoir to the applicator pad.

Turning now to FIGS. 7a-7e, there is shown schameticly the sequence of the movements of the applicator pad 33 and transverse member 36 with respect to the turf 32 and a laterally-growing weed 31 as the pad and transverse member move from right to left. The weed 31 is approached by the transverse member 36 in FIG. 7a, elevated by the transverse member in FIG. 7b, and flattened by the transverse member in FIG. 7c. In FIG. 7d the weed has been released by the transverse member 36 and flips upright, striking the applicator pad 33 which then applies herbicide to the weed. After the pad passes, the weed remains in a semi-upright position above the turf. Therefore, there is negligible migration of the herbicide from the weed to the turf. The lifting effect of the transverse member 36 and, to a lesser degree, the forward support members 39, 40 is important in killing weeds, such as crab grass and goose grass, that tend to grow laterally within the turf and, therefore, would be difficult to selectively treat with herbicide without being elevated.

For selectively applying herbicide to weeds in relatively uneven, newly seeded or newly spriged ground, a skid bar 55 is preferably attached to the transverse member 36, as shown in FIGS. 8 and 9. The skid bar minimizes the danger of uprooting the newly planted sprigs 58 and permits early treatment of the weeds 57 by the applicator pad 33 before the weeds have a chance to crowd out the sprigs.

Turning now to FIG. 10 there is shown a construction for increasing the amount of liquid herbicide stored in the applicator assembly. The transverse rail 45' is perforated at its base and each of its upper end portions is closed off by a separator 61 for defining a trough to hold a sponge 62 providing a large reservoir for the liquid herbicide. The liquid herbicide in the sponge gradually trickles or seeps through the perforations 63 and is received by the applicator pad 33. If the rail 45' is relatively thick, the perforations 63 could be filled with absorbent material such as cotton fiber to aid gradual transfer of liquid herbicide from the sponge 62 to the applicator pad 33.

Turning now to FIG. 11A, there is shown a cross-sectional view illustrating how an applicator pad generally designated 33' can be made to apply two different kinds of liquid chemicals to selected vegetation. A transverse partition 65 divides the upper reservoir into two separate compartments 66, 67 for storing two different kinds of liquid chemicals. Similarly, a lower transverse partition 68 is provided to divide the applicator pad 33' into two sections 69 and 70 for applying the respective different chemicals to the selected vegetation. The left-hand pad 69, for example, first applies a wetting agent such as a 4% aqueous solution of detergent, and then the right-hand pad 70 applies an herbicide. This arrangement would be especially useful for applying two chemicals that must be stored separately to have a reasonably long shelf life.

Turning now to FIG. 11B, there is shown an applicator pad generally designated 33" for first applying a liquid chemical such as a wetting agent and then applying a solid chemical such as herbicide to selected vegetation. A transverse rail 71 about half the size previously used is supported at its end portions by hangers such as hanger 48' similar to the hanger 48 previously used. The top end portions of the rail 71 are closed off by respective end pieces such as the end piece 61' to form an upper reservoir for holding a polyurethane sponge 66' saturated with a wetting agent such as a 4% aqueous solution of detergent. An applicator sponge 69' is glued to the bottom of the transverse rail 71 and receives wetting agent seeping through perforations 63' in the rail 71.

To apply herbicide to selected vegetation having been wetted by the applicator sponge 69', a sheet of nylon cloth 70' is stretched taut between two parallel spaced rails 68', 72. The respective end portions of the rails 68', 72 are each closed off by an end piece 74 forming a box for receiving powdered herbicide 73. Rail 68' is mounted to the bottom of the rail 71, and rail 72 is mounted at each end to the respective hanger 48' via a respective spacer 72' so that the nylon cloth 70' is horizontal as shown. During assembly, the sheet of nylon cloth 70' can be stretched by first gluing it to the rails 68', 72 before the rail 68' is mounted to the bottom of the rail 71 and the rail 72 is mounted at each end to the respective hanger 48'. When the nylon cloth is glued to the rails 68', 72 these rails are spaced from each other by 4% less than the spacing that occurs between these rails after these rails are mounted in the final assembly. Therefore, the nylon cloth becomes stretched and is taunt in the final assembly. The nylon cloth 70' is wetted just before the herbicide powder is sprinkled on top of the cloth, so that a thin cake 73 of solid herbicide is formed on the cloth. When wetted vegetation touches the underside of the cloth 70', a sufficient amount of herbicide dissolves from the cake 73 and is deposited on the vegetation. A suitable herbicide for forming the cake 73 is a powder of 75% sodium sesquisalt of glyphosphate sold by Monsanto under the trademark "POLADO."

Turning now to FIGS. 12-15, there are shown various views of an applicator assembly generally designated 75 having a high capacity herbicide reservoir generally designated 76 and means for regulating the flow of herbicide from the reservoir to an applicator pad 77. As should be evident from FIG. 12, the applicator assembly 75 is similar to the applicator assembly 30 shown in FIGS. 2 and 3 except for modifications for mounting the herbicide reservoir 76 and applicator pad 77. To make room for the reservoir 76, the hinged cover 53 is not used, and instead it is replaced with a shield 78. As more clearly shown in FIG. 13, the reservoir 76 and applicator pad 77 are mounted to the inclined elements 50' of the side frames by machine screws 79 which are indexed in a selected pair of holes 80 to set the height of the applicator pad 77.

Figure 13:
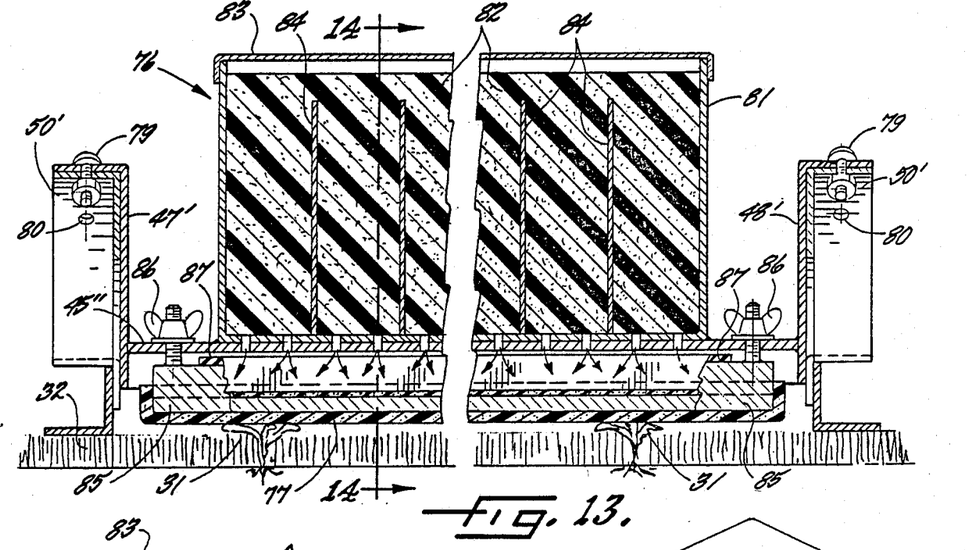
FIG. 13 is a cross-sectional view of the herbicide reservoir and applicator pad shown in FIG. 12 along line 13—13 in FIG. 12.
Figures 14, 15:
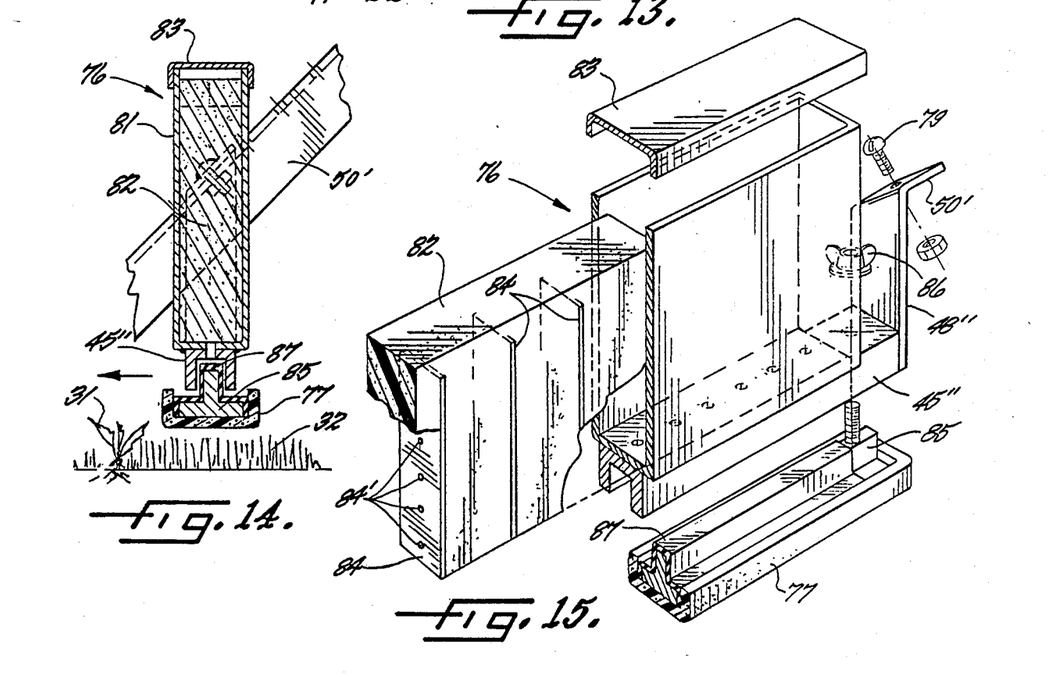
FIG. 14 is a cross-sectional view of the herbicide reservoir and applicator pad of FIG. 13 along line 14—14 in FIG. 13.
FIG. 15 is an exploded view of the herbicide reservoir and applicator pad shown in FIG. 13.

As shown in FIG. 13, the reservoir 76 comprises a container 81 receiving a sponge 82 and having a lid 83 which is removed for adding liquid herbicide to the sponge. The sponge 82 is preferably made of open cell polyurethane foam, and is slotted to receive a number of thin separators 84 which divide the lower portion of the reservoir 76 into a number of independent compartments. The separators 84 prevent the flow of liquid herbicide from one end of the reservoir 76 to the other when the applicator assembly 75 is drawn over terrain having a transverse slope. Each separator, however, has a few small perforations 84' for maintaining a uniform distribution of herbicide in the sponge 82.

In order to regulate the rate of feed of herbicide from the the reservoir 76 to the applicator pad 77, the pad is mounted on a transverse bar 85 which is in turn adjustably mounted below a transverse rail 45" attached to hangers 47' 48'. Specifically, the spacing of the transverse bar 85 and the transverse rail 45" is adjusted by thumb screws 86, and a strip of open cell polyurethane foam 87 is sandwiched between the bar 85 and the rail 45" in order to selectively convey the liquid herbicide from the reservoir 76 to the applicator pad 77. As shown in FIG. 13, the maximum rate of flow occurs when there is a gap between the lower surface of the rail 45" and the foam strip 87. The flow is restricted after the spacing is eliminated, and compression of the foam strip 87 by further reduction of the spacing between the bar 85 and rail 45" selectively reduces the flow to zero. To prevent dripping on transverse slopes, the thumb screws 86 can be differentially adjusted to vary the feed rate from one end of the applicator pad 77 to the other. Also, the applicator pad extends beyond each end of the reservoir 76 to prevent dripping on transverse slopes.

Figure 16:
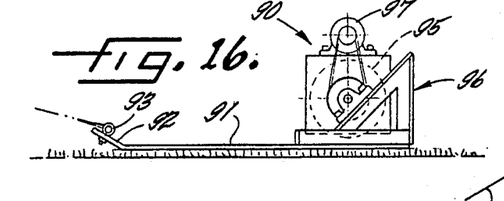
FIG. 16 is a side view of another applicator assembly using a cylindrical applicator pad rotated by an electric motor.
Figure 17:
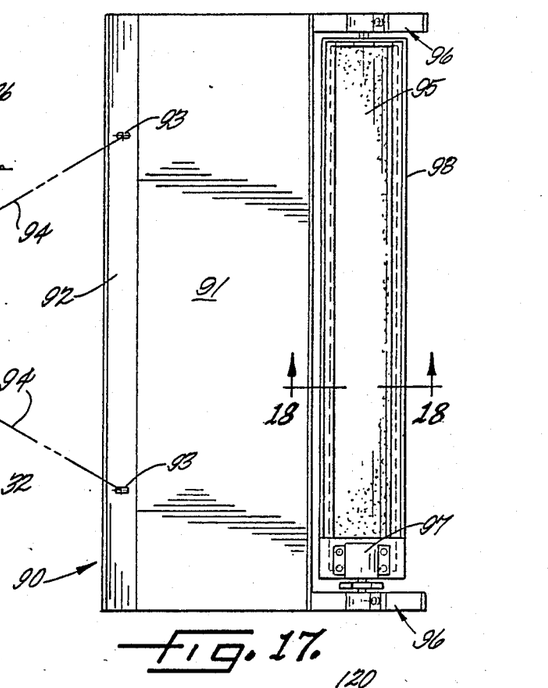
FIG. 17 is a plan view of the applicator assembly shown in FIG. 16.
Figure 18:
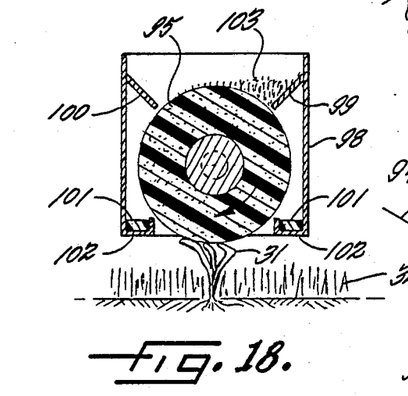
FIG. 18 is a cross-sectional view of the applicator pad of FIG. 17 along line 18—18 in FIG. 17.

Turning now to FIGS. 16-18, there is shown another embodiment of the invention generally designated 90 preferred for selectively applying herbicide to large areas of uneven terrain. To establish a ground reference for the uneven terrain, the applicator assembly includes a rather large flat skid 91 having an upturned front edge portion 92. To draw the applicator assembly 90 over a swath of terrain, a pair of eye bolts 93 are secured to the front edge portion 92 for the attachment of pull cords 94 which may be secured to the hitch of a maintenance vehicle such as the golf cart 29 shown in FIG. 1.

In order to apply liquid herbicide, a cylindrical applicator pad 95 is soaked with the herbicide and is journalled to an inclined mount 96 secured to the rear portion of the skid 91. The cylindrical pad 95 is rotated by an electric motor 97 in order to prevent dripping of the herbicide and also to remove debris picked up from the surface of the pad.

The cylindrical pad 95 is surrounded by a housing 98 having an upper hopper formed by a scrapper blade 99 and a baffle 100. Herbicide solution is initially poured along the top of the pad 95 and retained in the hopper 103 formed by the blade 99 and the pad and any excess herbicide is collected by sponges 101 disposed in troughs 102 formed in the lower portion of the housing 98. The blade 99 scrapes off grass clippings and other debris 103 having been picked up on the pad 95. Debris may also be dislodged by the blade 99 or baffle 100, and such debris is collected in the troughs 102. The dislodged debris is not permitted to fall on the turf 32 since the debris may be coated with herbicide solution.

Figure 19:
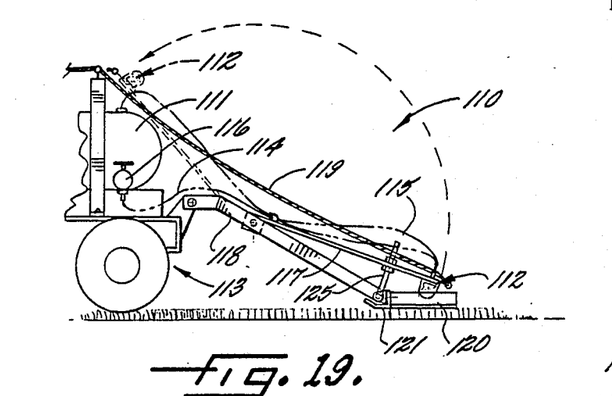
FIG. 19 is a side view of an applicator assembly having means for conveying liquid herbicide to an applicator pad from a tank carried on a vehicle, and for returning excess herbicide from the applicator pad to the tank.
Figure 20:
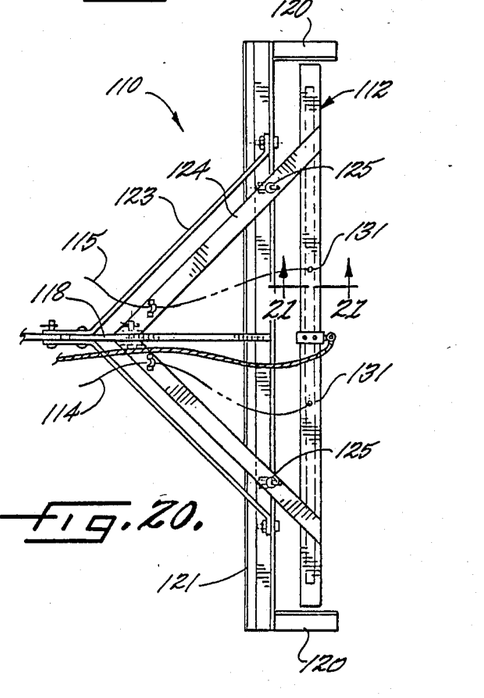
FIG. 20 is a plan view of the herbicide applicator of FIG. 19.
Figure 21:
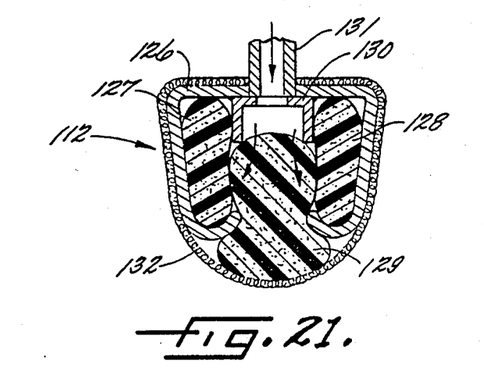
FIG. 21 is a cross-sectional view of the herbicide applicator pad of FIG. 20 along line 21—21 in FIG. 20.
Figure 22:
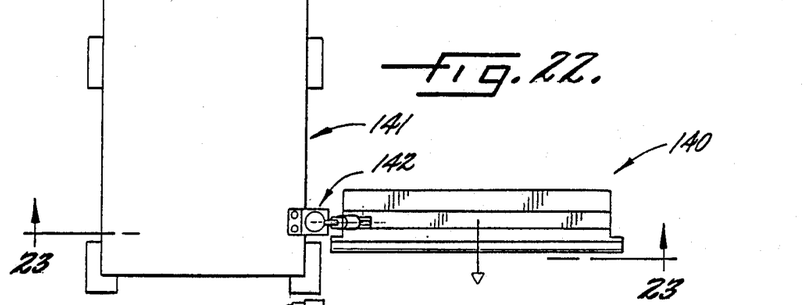
FIG. 22 is a plan view of an applicator assembly for use on the side of a maintenance vehicle and having a connection to the vehicle permitting the height and transverse slope of the applicator assembly to be different from that of the maintenance vehicle.

Turning now to FIGS. 19-21, there is shown another embodiment of the present invention generally designated 110 having means for transferring liquid herbicide from a tank 111 to a pivotally mounted applicator pad 112. The tank 111 is carried on the back of the maintenance vehicle generally designated 113 and is connected to the applicator 112 by a feed hose 114 and a return hose 115. As illustrated in FIG. 19, the applicator pad 112 is initially charged in its lower position by turning on a valve 116 for a certain period of time such as thirty seconds in order to saturate the applicator with liquid herbicide. The valve 116 could be throttled or shut off in order to prevent dripping of the herbicide due to the fluid static pressure.

In order to return any excess herbicide to the tank 111, the applicator pad 112 is mounted on a support 117 which is pivotally connected to a draw bar 118, and a maintenance person raises the applicator to an upper position shown in phantom lines by pulling a cord 119. With the pad 112 thereby raised above the tank 111, excess liquid in the pad flows by gravity from the pad via the return hose 115 to the top of the tank.

In order to precisely set the height of the applicator 112 above the ground, the applicator assembly 110 has a skid including side runners 120 and a transverse support member 121 having an upturned leading edge portion. As further shown in FIG. 20, the transverse support member 121 is attached to the central draw bar 118 as well as left and right side bars 122 and 123. The applicator 112 is supported by the left mounting bar 117 as well as a right mounting bar 124.

In order to precisely adjust the height of the applicator 112 above the ground, each of the pivoted bars 117, 124 has a respective adjustable stop 125 comprising a threaded rod fastened to the respective pivoted bar by a pair of nuts.

Turning to FIG. 21 the applicator pad 112 is shown in cross-section. For structural support the applicator 112 includes an extruded aluminum rail 126 that is packed with two absorbent wicks 127, 128 preferably made of open cell polyurethane foam, and a length of compressed nylon rope 129. In order to define an open channel for conveying liquid herbicide along the length o the applicator 112, a second aluminum rail 130 is disposed between the wicks 127-128, and liquid herbicide enters or exits through a tubular fitting 131. The applicator 112 is covered with fabric 132 providing a pad for transferring the liquid herbicide to the undesired vegetation.

Figure 23:
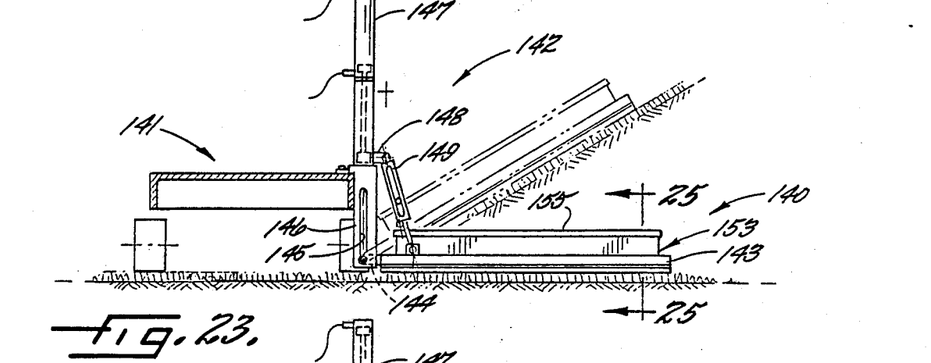
FIG. 23 is a front view of the applicator assembly of FIG. 22 in partial section along line 23—23 and which also shows the applicator assembly in a raised position indicated by phantom lines.
Figures 24, 25:
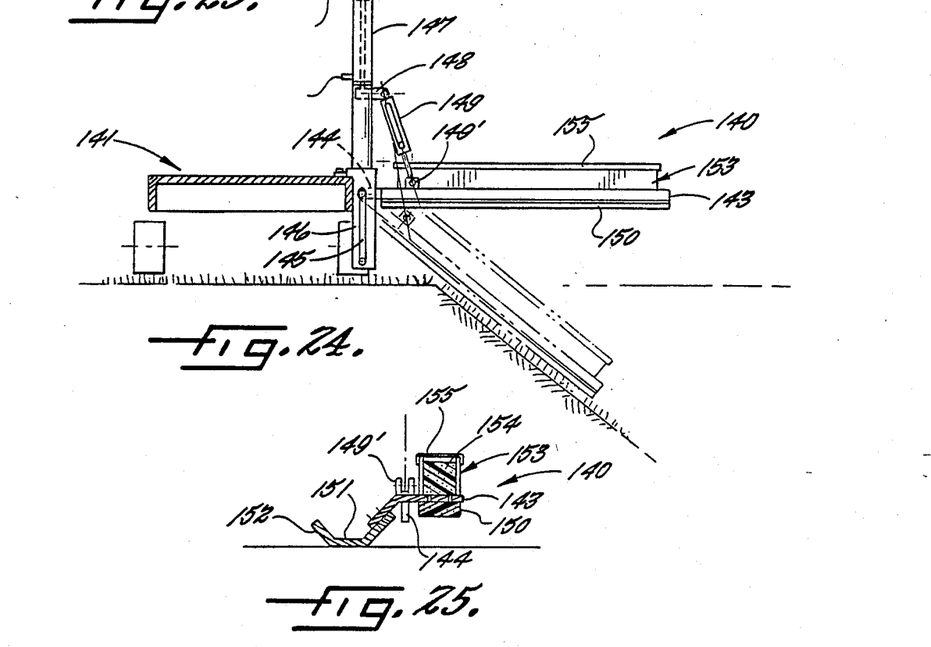
FIG. 24 is a front view of the applicator assembly of FIG. 22 which also shows the applicator assembly in a lowered position indicated by phantom lines.
FIG. 25 is a cross-sectional view of the applicator assembly along line 25—25 in FIG. 23.

Turning now to FIGS. 22-25 there is shown various views of another embodiment of the invention generally designated 140 for side mounting to a maintenance vehicle 141. For this purpose a mount 142 is provided which permits the height and transverse slope of the applicator assembly 140 to vary with respect to the height and transverse slope of the vehicle 141. As shown in FIG. 23, the applicator assembly 140 includes a horizontal frame 143 connected to the mount 142 by a "T" bar 144 engaging slots 145 in a guide tube 146 that is securely fastened to the vehicle 141. This arrangement permits the horizontal frame 143 to be raised or lowered as shown in FIGS. 23 and 24, but does not permit movement about any other axis. Therefore, the applicator assembly 140 is especially suited for applying herbicide to a sharp incline, as illustrated by the phantom lines in FIG. 23, or a sharp decline as illustrated in the phantom lines of FIG. 24.

Also as illustrated in FIGS. 23 and 24, means are provided for raising the entire applicator unit 143 to a substantial height above ground, as shown in the solid lines of FIG. 24. For this purpose an hydraulic cylinder 147 is activated to raise a lifter arm 148 which is connected to the horizontal frame 143 by a telescoping connector 149. When the lifter arm 148 is in its lowermost position, the telescoping connector 149 permits a substantial range of motion of the horizontal frame 143 and the lifter arm 148. However, when the hydraulic cylinder 147 is activated, the telescoping connector 149 assumes one of its limit positions to raise the horizontal frame 143 to its upper position as shown in FIG. 24.

A cross-sectional view of the applicator 140 is shown in FIG. 25. The applicator assembly includes an applicator pad 150 mounted beneath the horizontal frame 143. For establishing the pad 150 at a precise height above ground level, the frame 143 is fastened to a forward skid 151 having an upturned leading edge portion 152. The T connector 144 is mounted below the frame 143, and a bracket 149' for the telescoping connector 149 (see FIG. 24) is mounted above the frame 143. A liquid herbicide reservoir generally designated 153 is mounted above the frame 143 and supplies liquid herbicide through holes in the frame to the applicator pad 150. The reservoir 153 includes an open cell polyurethane sponge 154 which is filled with liquid herbicide by opening a cover 155.

Figures 26, 27, 28, 29, 30, 31, 32, 33:
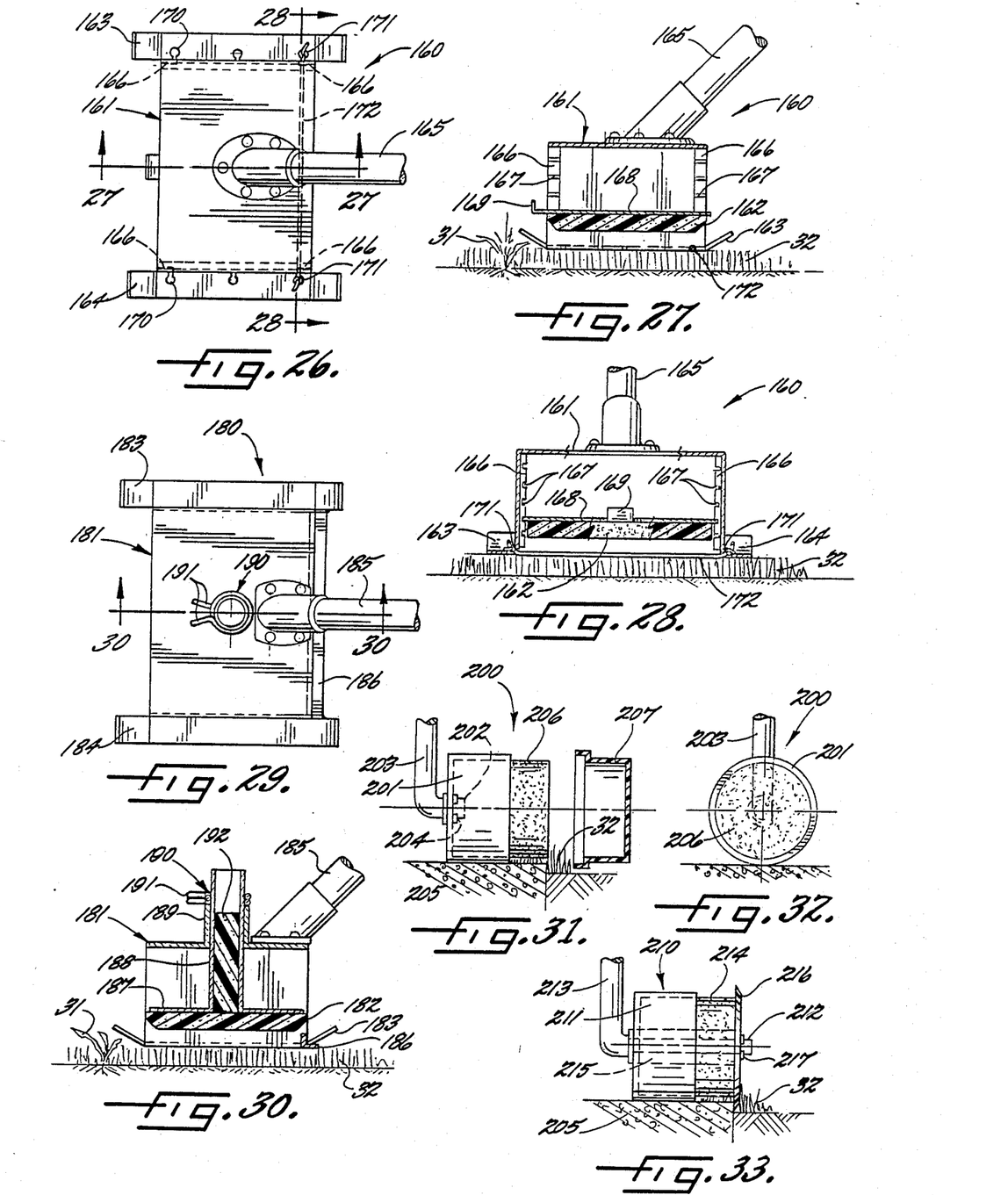
FIG. 26 is a plan view of a hand-operated applicator assembly.
FIG. 27 is a cross-sectional view along line 27—27 of FIG. 26.
FIG. 28 is a cross-sectional view along line 28—28 of FIG. 26.
FIG. 29 is an alternative hand-operated applicator assembly permitting continuous adjustment of the height of the applicator pad.
FIG. 30 is a cross-sectional view along line 30—30 in FIG. 29.
FIG. 31 is a front view of a hand-operated applicator assembly especially constructed for eradicating vegetation encroaching upon driveways and sidewalks.
FIG. 32 is a side view of the applicator assembly of FIG. 31.
FIG. 33 is a front view of a hand-operated applicator assembly especially constructed for eradicating vegetation at the edges of driveways or sidewalks.

Turning now to FIGS. 26-28 there is shown a hand-operated herbicide applicator generally designated 160 according to another aspect of the present intention. The applicator assembly 160 includes a horizontal frame 161 bridging an applicator pad 162 and resting on a pair of runners 163, 164 for establishing a ground reference. For drawing the applicator assembly 160 over a swath of vegetation, a handle 165 is attached to the top of the frame 161.

For setting the applicator pad 162 at a height just above the turfgrass 32, the frame 161 includes vertical supports 166 defining a plurality of sets of notches in the frame at various heights, each set of notches 167 being adapted to receive the applicator pad at a certain height. The pad 162 is backed by a plate 168 having a handle 169 to facilitate the setting of the height for the pad.

It should be appreciated that the frame 161 could be integrally formed with the runners 163 and 164 by cutting and bending a flat sheet of metal such as aluminum. In order to provide a set-up means, the frame 161 includes two pairs of holes and slots 170, 171 in the runners 163, 164. A strand of nylon monofilament 172 having a knot or bead on each of its ends is installed by compressing the frame with the applicator pad removed and inserting the beads through a selected pair of holes. In a pull mode, the operator pulls on the handle 165 to drive the applicator assembly, and in this mode the nylon monofilament 172 is strung between the second pair of slots 171 so that horizontally extending leaves of the weeds 31 are lifted so that they contact the applicator pad 162. It should be noted that the nylon strand 172 should not be placed between the first pair of slots and holes 170 in the pull mode since in such a case the nylon strand would tend to cause the upper leaves of the weeds 31, which have been wiped with herbicide, to be contacted with the turf 32.

In a "push" mode, in which the operator moves the frame 161 by pushing on the handle 165, the nylon strand 172 could be strung between the first pair of holes 170. For some weeds the lifting effect of the nylon strand may not be needed. In this case the strand 172 is entirely removed from the frame 161, and the applicator assembly 160 may be used in either a push or pull mode.

Turning now to FIGS. 29-30 there is shown another embodiment of a manually operated herbicide applicator generally designated 180. The applicator 180 includes a frame 181 bridging an applicator pad 182 and being supported on runners 183 and 184. A handle 185 is attached to the top of the frame 181 to permit the operator to guide the applicator assembly over the turfgrass 32. The applicator assembly 180 operates in a pull mode and has a transverse lifter-support bar 186.

In order to set the height of the applicator pad 182, the pad is backed by a flat plate 187 which is in turn supported by a cylindrical conduit 188 protruding through an aperture 189 in the top of the frame 181. For holding the pad 182 at a selected height, a wire spring clamp 190 engages the upper end portion of the cylindrical conduit 188.

To set the height of the applicator pad 182, the operator (not shown) grasps the top portion of the conduit 188 with one hand, and with the other hand grasps the tails 191 of the spring clamp 190 to disengage the spring, whereupon the conduit 188 is raised or lowered to a desired height. Once the desired height is obtained, the tails 191 of the spring clamp 190 are released to lock the pad 182 into the selected position. The conduit 188 is hollow so that liquid herbicide may be poured through the conduit 188 to the porous pad 182. In order to aid the distribution of herbicide to the pad 182, a cylindrical portion of sponge 192 is disposed in the conduit 188.

Turning now to FIGS. 31–32, there is shown another manually operated applicator assembly generally designated 200 especially suited for applying liquid herbicide to grass or weeds that encroach onto sidewalks and driveways. The applicator assembly 200 includes a cylindrical roller 201 journalled to an axle 202 formed in the end portion of a handle 203. A snap ring 204 secures the roller 201 to the axle 202.

So that herbicide is applied to the grass 32 as the operator guides the roller 201 over a sidewalk or driveway 205, a cylindrical applicator pad 206 is mounted to the roller 201. Preferably the applicator pad 206 is a porous material such as open cell polyurethane foam and therefore hold a considerable quantity of liquid herbicide without dripping. Preferably the roller 201 is hollow and the applicator pad 206 extends into the hollow portion of the roller to provide a large reserve capacity of herbicide. For shipping and storage purposes, a tight fitting cup-shaped polyethylene cover 207 may be used to encapsulate the applicator pad.

Turning now to FIG. 33, there is shown an alternative version of a manually operated roller applicator generally designated 210. In this case a roller 211 is also journalled to an axle 212 formed in the end portion of a handle 213, and a cylindrical applicator pad 214 is received in the roller. To guide the roller 211 along the edge of the sidewalk or driveway 205, the axle extends though a center post 215 formed in the roller for the mounting of a guide disc 216. The guide disc 216 is retained on the axle 212 by a snap ring 217.

In view of the above, a family of herbicide applicators has been disclosed for weed control in turfgrass, including applicators for wide area coverage in both unestablished and established terrain, as well as smaller applicators for trim work. The applicators maintain the herbicide applicator at a precise level just above the turfgrass and the large area applicators can cover a large area in a short time period despite uneven ground, clumps of weeds, and foreign objects. For use in established terrain, the applicator assembly is provided with a transverse lifter bar for elevating lengthly portions of weeds extending laterally below the surface of the turf, so that the surfaces of such weeds are raised to contact the herbicide applicator. Various means have been disclosed for storing a large reserve supply of liquid herbicide and for regulating the supply of herbicide to the active surface of the applicator for several hours of continuous operation. The herbicide reservoir, for example, includes a number of separate chambers and the transverse end portions of the applicator pad is tapered and sealed to prevent dripping during operation over slopping terrain. To prevent contamination of the applicator pad, the frame may shield the applicator pad and include forward support bars for diverting foreign objects, and a cylindrical applicator pad can be used which is rotated against a contacting bar for continuous removal and storage of foreign matter and excess herbicide from the pad's surface.

What is claimed is:

1. In an herbicide applicator assembly for applying herbicide to vegetation in a selective manner so that undesired vegetation that extends above desired vegetation is selectively killed, the combination comprising a horizontal frame, means for drawing the frame in a longitudinal direction along a swath of vegetation, an applicator pad mounted on the frame and extending transversely across the width of the swath, the pad being supported parallel to the ground and spaced therefrom at a height which is just slightly greater than that of the desired vegetation, said applicator pad carrying said herbicide so that as the frame is drawn along the swath the relatively tall undesired vegetation is wiped by the pad while the desired vegetation is unaffected, said horizontal frame including a pair of spaced-apart elongated runners, said runners being elongated along said longitudinal direction and having flat planar underside surfaces elongated along said longitudinal direction and parallel to the ground surface, said runners extending in said longitudinal direction and resting on the ground, and a horizontal transverse support member resting on the ground forward of said applicator pad and continuously traversing the width of said frame from one of said runners to the other, said runners thereby defining a reference height above the ground for support of said pad at a precise height above ground, and said horizontal transverse support member ensuring that said frame is raised and supported on high spots occurring in said ground between said runners when said horizontal frame is drawn across said high spots.

2. The combination as claimed in claim 1, wherein said frame further includes two horizontal forward support bars intersecting at a connection to said means for drawing the frame, said forward support bars having respective rear end portions connected to respective ends of said transverse support member.

3. The combination as claimed in claim 2, wherein said forward support bars are formed from angle rail having a horizontal planar portion for resting on the ground and a rearwardly disposed vertical planar portion, so that said forward support bars form a plow for diverting foreign objects from the path of the applicator assembly and for lifting horizontally-growing weeds above the turf.

4. The combination as claimed in claim 2, further comprising a forward skid resting on the ground for supporting said connection.

5. The combination as claimed in claim 1, further comprising a cover hinged to said transverse support member and covering the applicator pad.

6. The combination as claimed in claim 1, wherein each of the end portions of the applicator pad is adjustably mounted to a selected vertical position on an incline of an inclined support resting on a respective one of the runners.

7. The combination as claimed in claim 1, wherein the applicator pad is made of porous material for receiving and holding said herbicide in liquid form.

8. The combination as claimed in claim 7, wherein the applicator pad is tapered and sealed at its transverse end portions.

9. In an herbicide applicator assembly for applying herbicide to vegetation in a selective manner so that undesired vegetation that extends above desired vegetation is selectively killed, the combination comprising a horizontal frame, means for drawing the frame in a longitudinal direction along a swath of vegetation, an applicator pad extending continuously in a transverse direction across the width of the swath, and adjustable support means for permitting an operator to freely select the vertical position of said pad with respect to said frame so that the pad is supported parallel to the ground and spaced therefrom at a selected height which is just slightly greater than that of the desired vegetation, said applicator pad carrying said herbicide so that as the frame is drawn along the swath the relatively tall undesired vegetation is wiped by the pad while the desired vegetation is unaffected, wherein said horizontal frame includes a flat plate resting on the ground, said flat plate extending in said transverse direction across the width of the swath and also extending in said longitudinal direction so that the flat plate provides a uniformly flat surface in contact with the ground and a ground reference height for supporting said pad when the frame is drawn over rough ground.

10. The combination as claimed in claim 9, wherein said flat plate has an upturned leading edge portion extending in said transverse direction.

11. The combination as claimed in claim 10, wherein said means for drawing said frame is attached to said frame at said leading edge portion.

12. The combination as claimed in claim 9, wherein said adjustable supports include a pair of transversely spaced inclined supports, each inclined support adjustably mounting a respective transverse end portion of said applicator pad to a respective transverse end portion of said flat plate.

13. In an herbicide applicator assembly for applying herbicide to vegetation in a selective manner so that undesired vegetation that extends above desired vegetation is selectively killed, the combination comprising a horizontal frame, means for drawing the frame along a swath of vegetation, an applicator pad mounted on the frame and extending the width of the swath, the pad being supported parallel to the ground and spaced therefrom at a height which is just slightly greater than that of the desired vegetation, said applicator pad carrying said herbicide so that as the frame is drawn along the swath the relatively tall undesired vegetation is wiped by the pad while the desired vegetation is unaffected, and a horizontal set-up member collected to the frame and extending along and spaced parallel to a leading edge of the pad and in close grazing proximity to the ground, the set-up member having a leading edge portion so that as the frame is advanced the set-up member wedges under any presented horizontally extending leaves on the undesired vegetation effectively setting them into vertical position for wiping by the pad.

14. In a herbicide applicator assembly for applying herbicide to vegetation in a selective manner so that undesired vegetation that extends above desired vegetation is selectively killed, the combination comprising a horizontal frame, means for drawing the frame in a longitudinal direction along a swath of vegetation, an applicator pad mounted on the frame and extending the width of the swath in a transverse direction, the pad being supported parallel to the ground and spaced therefrom at a height which is just slightly greater than that of the desired vegetation, said applicator pad carrying said herbicide so that as the frame is drawn along the swath the relatively tall undesired vegetation is wiped by the pad while the desired vegetation is unaffected, and wherein said horizontal frame includes a horizontal skid extending the width of the swath in the transverse direction along and spaced parallel to and ahead of a leading edge of the pad and resting on the ground.

15. A method of controlling weed growth in turfgrass comprising the steps of mowing the turfgrass, waiting for weeds to grow above the level of the turfgrass, and then sliding a skid over the turfgrass, said skid having flat portions resting on the ground underlying the turfgrass and supporting an applicator pad parallel to the ground and set at a predefined height just exceeding the level of the turfgrass, said applicator pad carrying herbicide which is thereby selectively applied to the weeds to terminate their growth.

16. A device for selective application of herbicide onto undesired vegetation, comprising:
a frame;
a pair of runners secured to said frame adapted to maintain said frame a predetermined distance above the ground;
a herbicide applicator pad mounted transversely on said frame; and
first means mounted on said frame forward of and positioned below the elevation of said herbicide applicator pad and extending from one of said runners to the other for engaging undesired vegetation at an elevation lower than that of said herbicide applicator pad and lifting said undesired vegetation to the height of said herbicide applicator pad and for raising and lowering said herbicide applicator pad in response to variations in the ground between said runners to maintain said herbicide applicator pad at a predetermined distance above the ground.

17. The device for selective application of herbicide onto undesired vegetation set forth in claim 16 further comprising at least one forward support member extending forwardly of said first means, said forward support member mounted to engage debris and move said debris out of the path of said first means, said forward support member including a skid member to prevent gouging of the ground by said forward support member.

18. A selective herbicide application apparatus for applying herbicide onto selected vegetation while avoiding application of the herbicide to other vegetation interspaced in said selected vegetation, comprising:
a frame;
a herbicide application pad removably mounted on said frame;
support means for movably positioning said herbicide application pad on said frame at a selected distance above said other vegetation; and
a barrier member secured to said frame and extending forwardly of said herbicide pad at a preselected distance relative to said other vegetation, said preselected distance being sufficient to avoid gouging engagement with said other vegetation and to allow engagement with debris on said other vegetation; said barrier member being mounted on said frame in a position to move said debris out of the path of said herbicide application pad prior to engagement with said herbicide.

19. The selective herbicide application apparatus claimed in claim 18 further comprising a ground engagement member for engaging variations in the contour of the ground not otherwise contacting said frame and moving said herbicide pad to maintain said pad at said selected distance above said other vegetation.

20. The selective herbicide application apparatus claimed in claim 18 further comprising a skid on said barrier member for engaging the ground.

* * * * *

UNITED STATES PATENT AND TRADEMARK OFFICE
CERTIFICATE OF CORRECTION

PATENT NO. : 4,908,981

DATED : MARCH 20, 1990

INVENTOR(S) : JAMES E. MOORE

It is certified that error appears in the above-identified patent and that said Letters Patent is hereby corrected as shown below:

In Col. 1, line 35, after "thereon"", please insert --.--.
In Col. 1, line 45, after "tractors", please insert --.--.
In Col. 2, line 44, after "terrain", please insert --.--.
In Col. 9, line 15, please change "o" to --of--.
In Col. 13, line 36, please change "collected" to --connected--.

Signed and Sealed this

Ninth Day of April, 1991

Attest:

HARRY F. MANBECK, JR.

*Attesting Officer*   *Commissioner of Patents and Trademarks*